United States Patent [19]

Kanemitsu et al.

[11] Patent Number: 5,358,304
[45] Date of Patent: Oct. 25, 1994

[54] FRONT BODY STRUCTURE OF A VEHICLE AND ASSEMBLING METHOD

[75] Inventors: Norihiko Kanemitsu; Kazuhiro Hara; Takashi Umeda; Masamichi Kogai; Kiyoshige Yamada, all of Hiroshima, Japan

[73] Assignee: Mazda Motor Corporation, Hiroshima, Japan

[21] Appl. No.: 97,732

[22] Filed: Jul. 27, 1993

Related U.S. Application Data

[63] Continuation of Ser. No. 908,868, Jul. 1, 1992, abandoned, which is a continuation of Ser. No. 629,854, Dec. 18, 1990, abandoned.

[30] Foreign Application Priority Data

Dec. 21, 1989 [JP] Japan ................... 1-333140

[51] Int. Cl.⁵ ............................................. B62D 25/08
[52] U.S. Cl. .................................. 296/194; 296/196; 296/197; 180/68.4; 414/589
[58] Field of Search ............ 296/194, 196, 197, 203, 296/198; 180/68.4; 293/115; 908/868; 29/281.4; 269/17; 414/589

[56] References Cited

U.S. PATENT DOCUMENTS

| 2,395,411 | 2/1946 | Kittel | 414/589 |
|---|---|---|---|
| 2,955,870 | 10/1960 | Richards | 296/194 |
| 3,596,978 | 8/1971 | Wessells, III et al. | 296/194 |
| 4,406,489 | 9/1983 | Trabert | 293/115 |
| 4,428,447 | 1/1984 | Malen | 296/194 X |
| 4,542,934 | 9/1985 | Komatsu et al. | 296/194 |
| 4,589,184 | 5/1986 | Asano et al. | 29/407 X |
| 4,597,603 | 7/1986 | Trabert | 296/194 |
| 4,964,672 | 10/1990 | Fujii | 296/194 X |
| 4,973,102 | 11/1990 | Bien | 296/198 X |
| 4,978,164 | 12/1990 | Nakamura et al. | 296/197 |
| 5,051,056 | 9/1991 | Gibbons et al. | 269/17 X |

FOREIGN PATENT DOCUMENTS

| 0274993 | 7/1988 | European Pat. Off. | 296/194 |
|---|---|---|---|
| 3247989 | 6/1984 | Fed. Rep. of Germany . | |
| 3544124 | 7/1987 | Fed. Rep. of Germany . | |
| 0011976 | 1/1984 | Japan | 296/194 |
| 0186780 | 10/1984 | Japan | 296/194 |
| 63-103771 | 5/1988 | Japan . | |
| 0212184 | 9/1988 | Japan | 296/194 |
| 0227479 | 9/1988 | Japan | 296/194 |
| 2081930 | 2/1982 | United Kingdom | 414/589 |

Primary Examiner—Dennis H. Pedder
Attorney, Agent, or Firm—Thompson, Hine and Flory

[57] ABSTRACT

A front body structure of a vehicle and a method of assembling the front vehicle body in such a manner that a nose unit having at least both a shroud panel and a shroud upper is mounted to a front vehicle body having on both right and left sides front fenders. A mounting portion is provided further inboard or lower than a mounting portion for the front fender. A fixing portion fixed to the mounting portion is formed on both ends of the shroud upper constructing the nose unit. Furthermore, a step portion which is a mounting portion for the nose unit is formed on the upper portion of the engine room and on further front and lower than the monting portion for the front fender mounted to the vehicle body.

38 Claims, 19 Drawing Sheets

FRONT BODY STRUCTURE OF A VEHICLE AND ASSEMBLING METHOD

This is a continuation of co-pending U.S. patent application Ser. No. 07/908,868, filed Jul. 1, 1992, now abandoned, which is a continuation of U.S. patent application Ser. No. 70/629,854, filed Dec. 18, 1990, now abandoned.

BACKGROUND OF THE INVENTION

This invention relates to a front body structure of a vehicle, wherein a nose unit having at least a shroud panel and a shroud upper is mounted to a front part of a vehicle body, and an assembling method of it.

In the conventional art of the vehicle assembling line (main line), since each component to be fitted to a front part of a vehicle body such as a bumper, a radiator grille, head lumps, and a radiator is fitted at each different station, the number of stations increased and accordingly, the line becomes longer and more complicated. It also has an operational problem since the operator on a mixed flow line, in which a various type of vehicles are assembled, needs to make a decision whether the components should be fitted to the body depending on a vehicle type.

By incorporating several components into one unit, easing the operation on the assembling line and reducing the number of stations can be planned. By this, better precision for fitting components to the unit can also be improved since the whole unit is assembled in a separate line.

Considering the above aspects, the Japanese Patent Application Laying Open Gazette No. 63-103771 proposes to incorporate components such as a radiator, head lumps, a bumper, and a radiator grille to one unit by fitting them to a radiator core support and mount this unit to a front part of a vehicle body.

However, under such a structure that the unit is inserted from the front, it may not be applied for such contemporary vehicles that a front fender curves to the inboard greatly and consequently they have a narrower front end of a vehicle. In other words, as shown in FIG. 26, both ends $b_1$ of the shroud upper b which is a mounting portion for the unit to the vehicle body (wheel apron reinforcement a) at inserting a unit may interfere with the front end portion $c_1$ of the front fender positioned in the inner side of the vehicle body. The vertical line Q designates an inserting line of the unit and the dotted lone P designates a mounting position of the unit.

SUMMARY OF THE INVENTION

The object of the present invention is to provide a front body structure of a vehicle, wherein a nose unit is mounted to a front part thereof without interfering with a front fender, and an assembling method of the front body structure.

This invention presupposes that the nose unit having at least both a shroud panel and a shroud upper is mounted to a front part of the vehicle body, and right and left front fenders are mounted thereon. A mounting portion is provided on a further inner side or lower than a mounting portion for front fenders to a vehicle body. On both ends of the shroud upper constructing the nose unit, fitting parts fitted to the above mounting portion are formed. Concretely, the present invention comprises a base part mounted around the front end portion of the wheel apron reinforcement by brackets and mounting portions extending inboard from the base part, a fitting portion for the shroud upper of the nose unit is fitted to the mounting portion.

Accordingly, since in the present invention, the mounting portion on the vehicle body side, wherein the fitting portion for the shroud upper of the nose unit is fixed, is provided on further inner or the lower than the mounting portions for the front fender mounted to the vehicle body, the mounting portions are positioned slightly differently from the mounting portion for the front fender. This results in that the nose unit can be mounted on the vehicle body without interfering with the front fender when inserting the nose unit to the vehicle body from the front.

The mounting portions are brackets in this invention. This invention comprises a first fitting portion, fixed to a front fender on the base end portion of the bracket, and a second fitting portion fixed to a front fender and a wheel apron.

By this structure, the brackets, which are mounting portions are fixed to the front fender on the first fitting portions, then the bracket is fixed to the wheel apron with the front fender on the second fitting portion. Through these mounting steps, the bracket is fixed to the wheel apron (the vehicle body) when the front fender is mounted to the wheel apron without being fixed to the front fender, wheel apron and the nose unit.

Also, the mounting portion for this invention is a bracket positioned further inner and lower than the mounting portions of the front fender and is fixed to the wheel apron, and it comprises an upper surface where the fixing portion for the shroud upper is fixed. The bracket, having a hollow (recessed to the inside), welded to the flange part and the inner side of the wheel apron.

Furthermore, under such a structure, a nose unit having at least both a shroud panel and a shroud upper is mounted to the vehicle front body having right and left front fenders, a step portion which is a mounting part of the nose unit is formed below the mounting portion on the upper surface of the side wall of the engine room of the vehicle body and on further front than the mounting portion for the front fender to the vehicle body. On the both ends of the shroud upper of the nose unit, a first fixing portion which is fixed to the step portion is formed.

In this invention, the step portion, where the first fixing portion for the shroud upper of the nose unit is fixed, is formed to be on further front and lower than the mounting part of the front fender to the vehicle body. Accordingly, the mounting portion (the step portion) for the nose unit is positioned slightly front of mounting portion for the front fender. When the nose unit is inserted to the vehicle body from the front, it is done by positioning the first fixing portions for the shroud upper of the nose unit without interfering the front fender by the nose unit.

Furthermore, in this invention, the step portion is formed on the upper side of the front end of the wheel apron and the first fixing portion extends horizontally on the end portion of the shroud upper. The end portion of the shroud upper comprises a second fixing portion extending vertically, the second fixing portion is fixed to an inner side of the wheel apron.

In the present invention, both ends of the shroud upper of the nose unit comprises a second fixing portion, the ends of the shroud upper of the nose unit are fixed to the front end of the front fender forward of the mounting portion.

Since the second fixing portion for the shroud upper is fixed to the end portion of the front fender forward of the step portion where the first fixing portion is fixed, the present invention can be applyed when the end of the front fender is extends further to the front than the vehicle body.

In a method of mounting a nose unit comprising at least both a shroud panel and a shroud upper to the front part of the vehicle, right and left front fenders are mounted thereon, comprises steps as follows: providing a mounting portion for the shroud upper to the vehicle body having right and left front fenders further inner or lower than the front fender, mounting the nose unit to the vehicle body, and fixing both end portions of the shroud upper provided on the nose unit to the mounting portion for the shroud upper.

Since the mounting portion for the shroud upper is provided slightly inward or lower than the mounting portion for the front fender mounted to the vehicle body and the nose unit is mounted to the vehicle body, even when the nose unit is mounted to the vehicle body from the front, it can be finished without the nose unit (the shroud upper interfering with the front fender). Accordingly, both ends of the shroud upper of the nose unit are positioned and fixed at the mounting portion for the shroud upper of the vehicle body and mounting becomes easier.

In a method of mounting a nose unit, comprising at least both a shroud panel and a shroud upper, to the front part of a vehicle having right and left front fenders mounted thereon, the steps are as follows: providing a mounting portion for the shroud upper to the vehicle body having right and left front fenders further front and lower than the mounting portion for the front fender, mounting the nose unit to the vehicle body, and fixing both end portions of the shroud upper provided on the nose unit to the mounting portion for the shroud upper.

Since the mounting portion for the shroud upper is provided further front and lower than the mounting portion for the front fender mounted to the vehicle body, and since the mounting portion for the shroud upper is slightly in the front of the mounting portion for the front fender, even when the nose unit (the shroud upper) is mounted to the vehicle body from the front, it can be finished without the nose unit interfering with the front fender. Accordingly, both ends of the shroud upper of-the nose unit are positioned and fixed at the mounting portion for the shroud upper of the vehicle body and mounting becomes easier.

The above and other objects, features, and advantages of the present invention will be more apparent with the description of the prefered embodiment in reference to the accompanying drawings.

BRIEF DESCRIPTION OF THE DRAWINGS

Accompanying drawings show prefered embodiments of the present invention.

FIGS. 9–11 show the second embodiment, in which

FIG. 9 is a detailed view around a bracket;

FIG. 10 is a sectional view taken on a line 10—10 of FIG. 9;

FIG. 11 is a perspective view of a front part of a vehicle body.

FIGS. 12 and 13 show the third embodiment, in which

FIG. 12 is a detailed view of a fixed part of a fixing portion for a shroud upper;

FIG. 13 is a perspective view of a front part of a vehicle body.

FIG. 14 and 15 show the forth embodiment, in which

FIG. 14 is a detailed view of a fixed portion for a fixing portion for a shroud upper;

FIG. 15 is a sectional view taken on line 15—15 of FIG. 14.

FIGS. 16–18 show a modification, in which

FIG. 16 is a detailed view around a bracket;

FIG. 17 is a sectional view on line 17—17 of FIG. 16;

FIG. 18 is a perspective view of a front body of a vehicle body.

FIGS. 19–25 show the fifth embodiment of the present invention, in which

FIG. 19 is a diagram illustrating a relationship between a unit base and a jig for mounting a unit base;

FIG. 20 is a exploded perspective view of a nose unit;

FIG. 21 is a descriptive diagram of a mounting for a nose unit to a front part of a vehicle body;

FIG. 22 is a diagram illustrating a front part of a vehicle body after a nose unit is mounted;

FIGS. 23–25 are sectional views taken on lines 23—23, 24—24, 25—25 of FIG. 21 respectively.

DESCRIPTION OF THE PREFERRED EMBODIMENT

The prefered embodiment will be described below with reference to the accompanying drawings.

Figure 1:
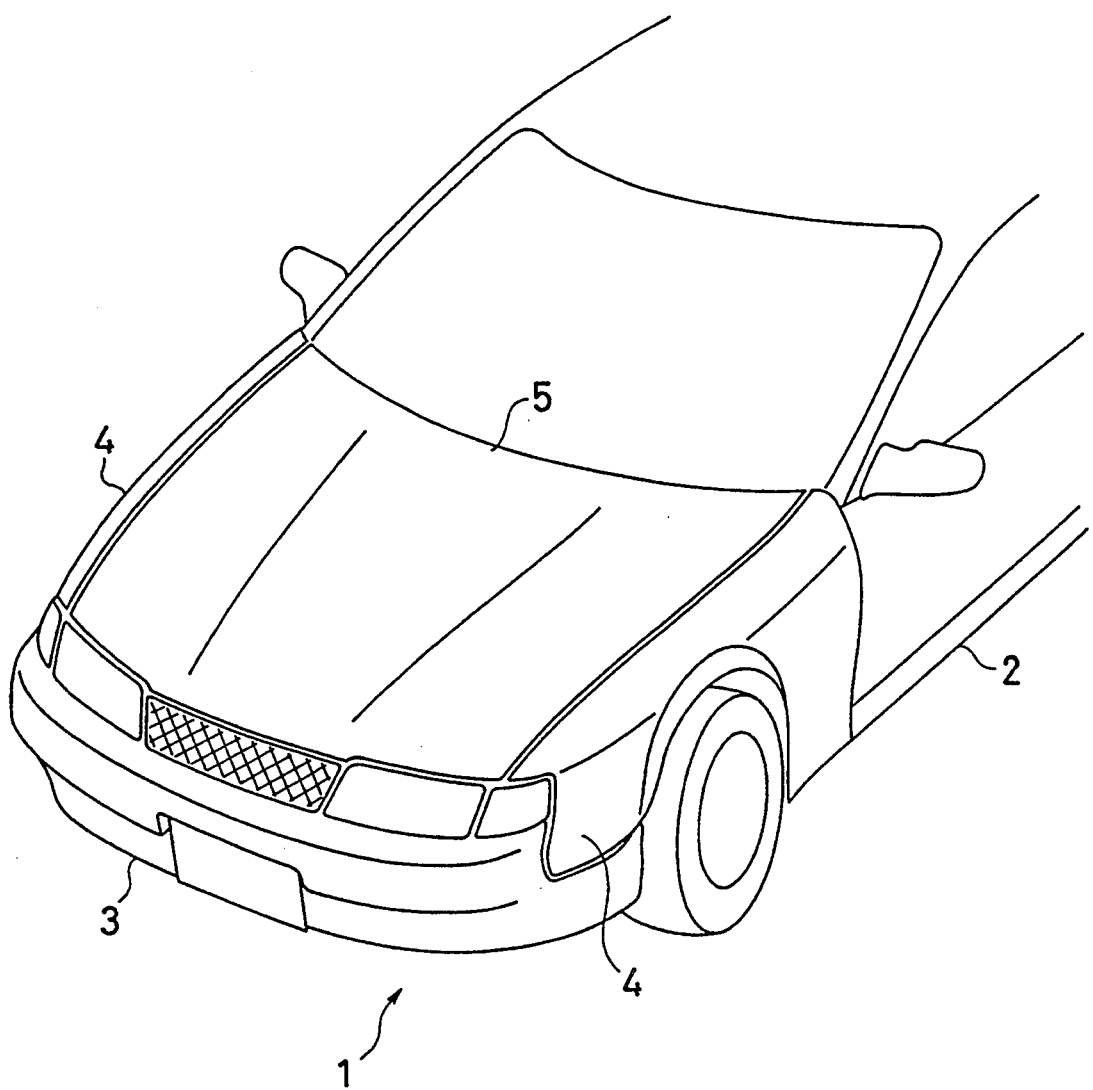
FIG. 1 is a perspective diagram of a front part of a vehicle.

In FIG. 1 illustrating a front part of a vehicle, reference numeral 1 designates a vehicle, a nose unit 3 is mounted on the front part of a vehicle body 2. Front fenders 4 are provided on the both sides of the body 2, and a bonnet 5 is provided on the front top of the vehicle body 2.

Figure 2:
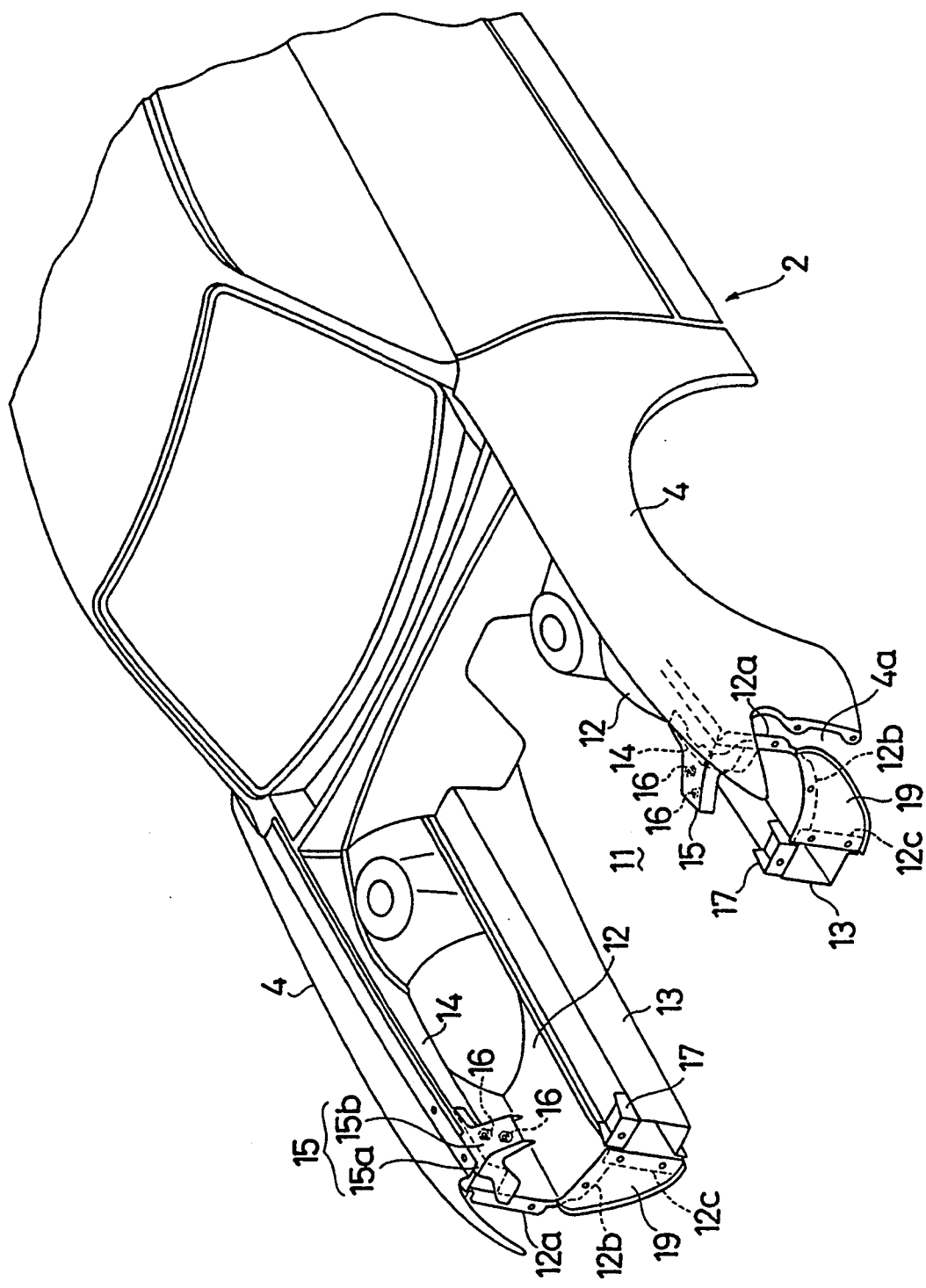
FIG. 2 is a perspective diagram of a front part of a vehicle body.

In the vehicle body 2, as shown in detail in FIG. 2, front side frames 13 are connected to the vehicle body under a wheel aprons 12 forming right and left side walls of an engine room 11 and a wheel apron reinforcement 14 are connected to the vehicle body above the wheel aprons 12 so that both top and bottom closed sectional construction extending longitudinally of the vehicle body are formed.

Figure 3:
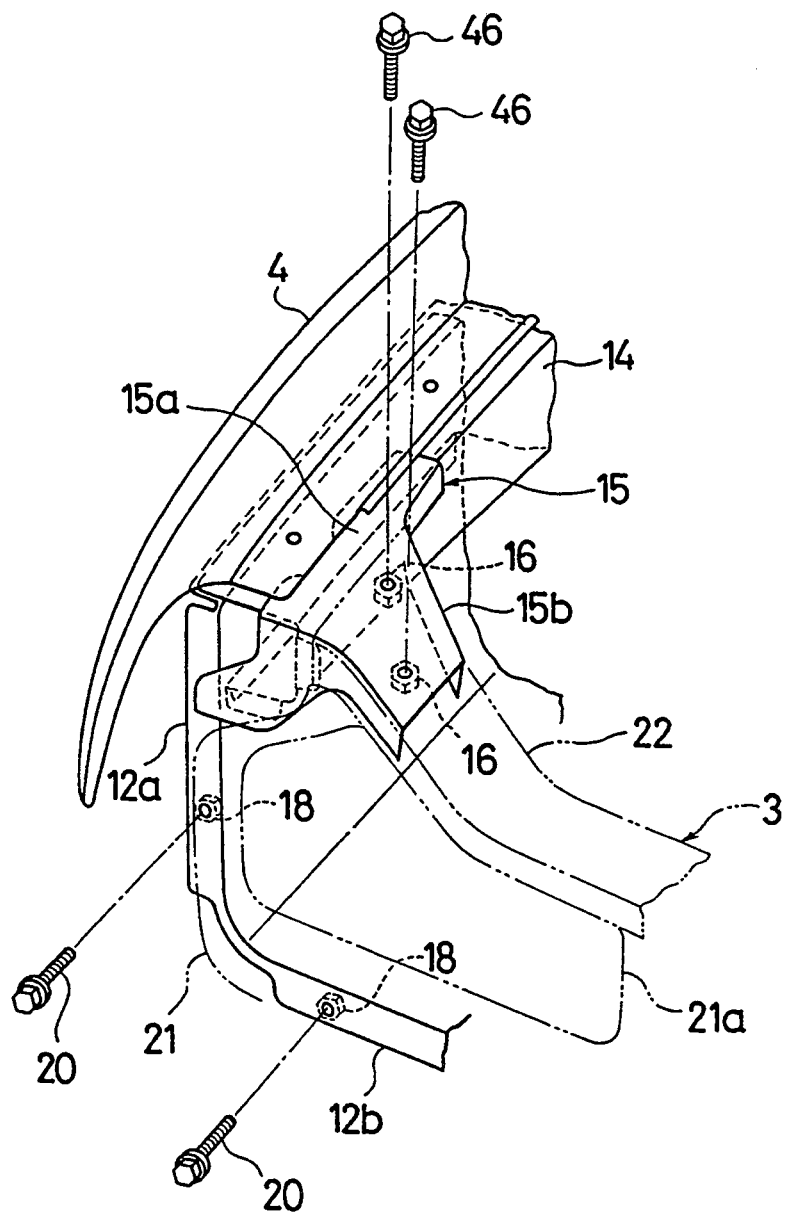
FIG. 3 is a detailed view around a bracket.

A bracket 15 projecting to the inner side of the vehicle body is provided around the wheel apron reinforcement 14. The bracket 15, as shown in FIG. 3, comprises a base part 15a fitted to the wheel reinforcement 14 and a mounting portion 15b extending inboard from the base part 15a, a fitting portion 22b of a shroud upper 22 of a nose unit 3 (FIG. 4) is mounted to the mounting portion 15b. Two nuts 16 are welded on the under side of the mounting part 15b. Other brackets 17 are provided on the front top ends of the front side frames 13.

Mounting flange portions 12a, 12b, 12c are formed on the front end portion of the wheel apron 12. Nuts 18 for fixing a shroud panel 21 by bolts 20 is welded on the under surface of the flange portions 12a, 12b. A nut 37 for fixing the shroud panel 21 and the junction panel 31 by a bolt 34 are welded on the under surface of the flange portion 12c.

Also, front end panels 19 are provided on the front end portion of the wheel aprons 12.

Figure 4:
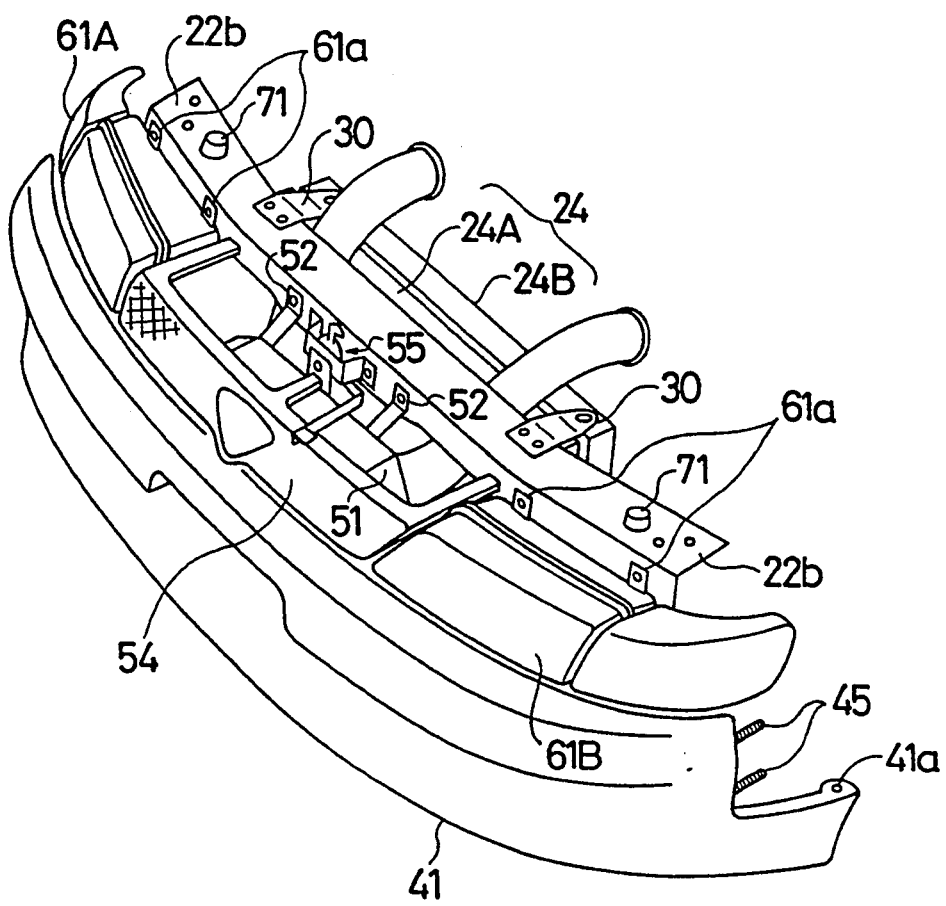
FIG. 4 is a perspective view of a nose unit.
Figure 5:
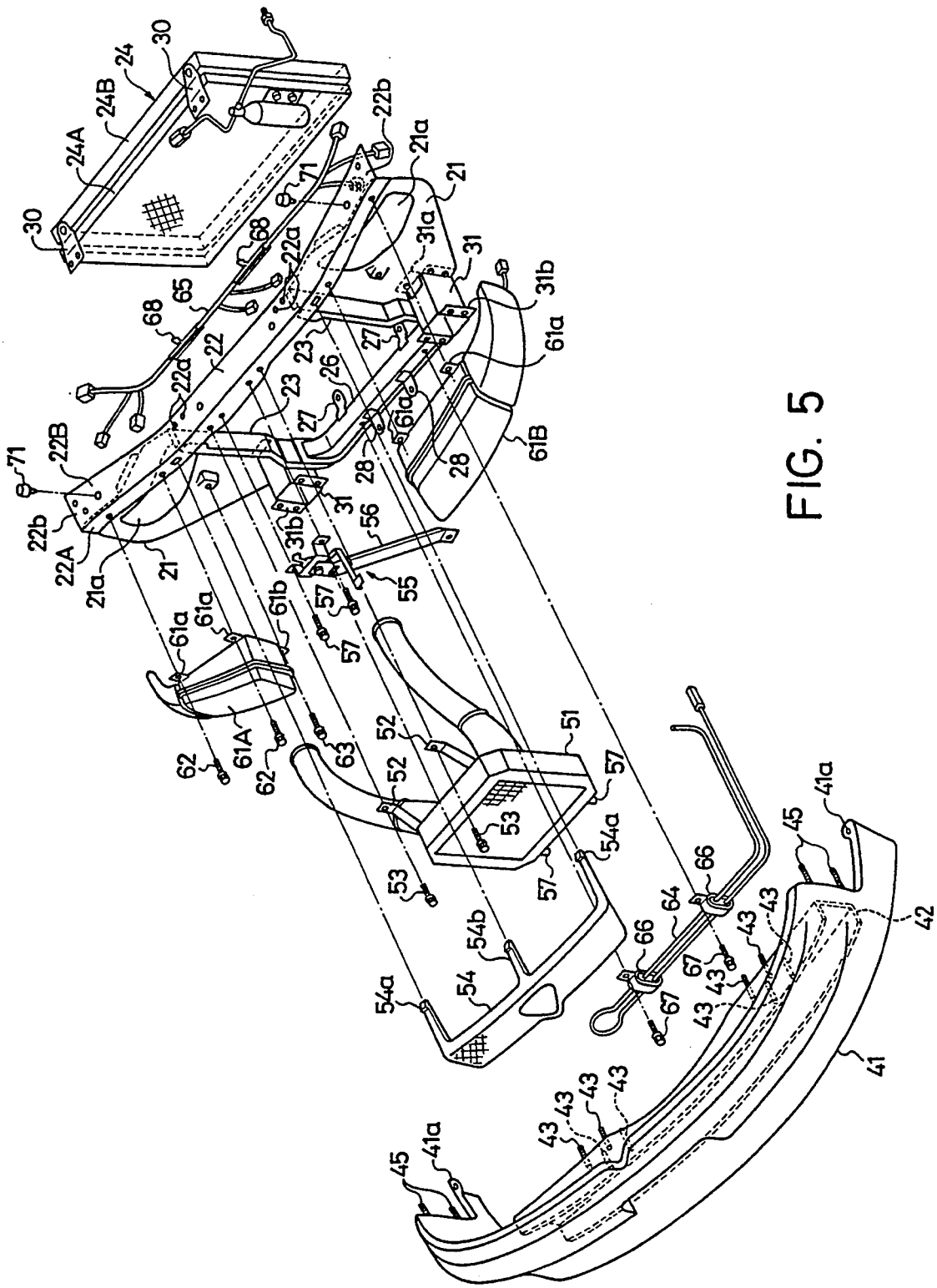
FIG. 5 is an exploded perspective view of a nose unit.
Figure 6:
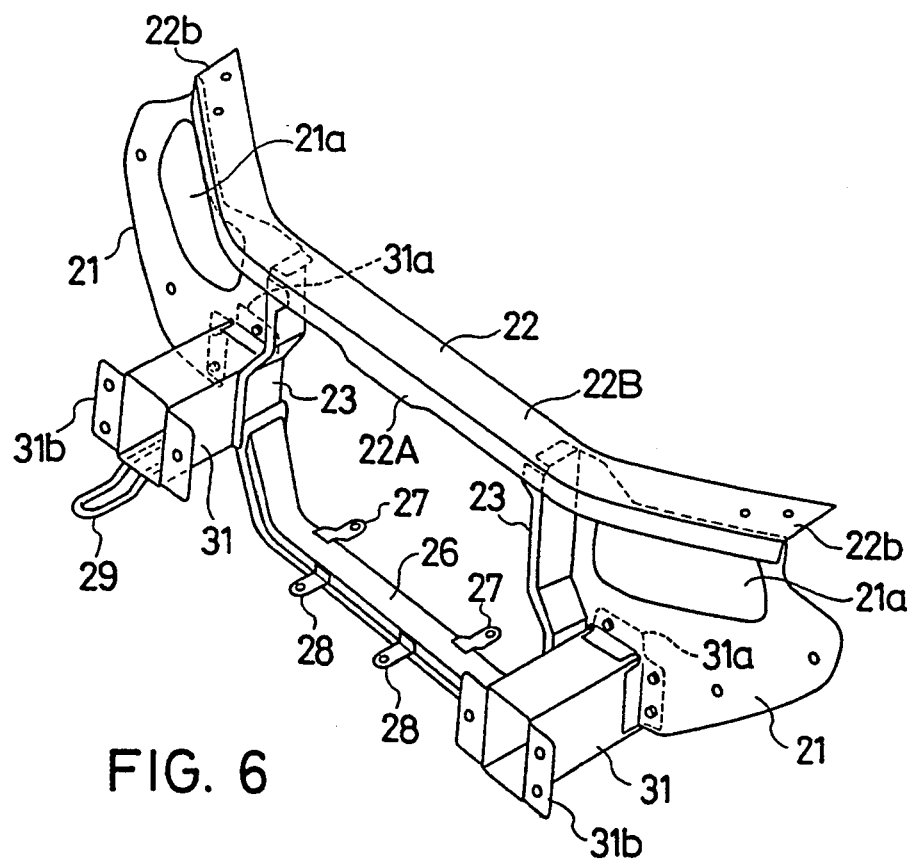
FIG. 6 is a schematic perspective view of a unit base of a nose unit.

The nose unit 3 is constructed as illustrated in detail in FIGS. 4 and 5. The unit base of the nose unit 3 is connected to the shroud upper 22 extending in the widthwise direction of the vehicle body on the upper end portions of the shroud panels 21 as shown in FIG. 6. This shroud upper 22 comprises a vertical wall part 22A extending vertically and an upper wall part 22B extending rearwardly from the upper end of the vertical wall part 22A. A pair of vertical members 23 are hanging down from a center part in the widthwise direction of the upper wall part 22B.

Figure 7:
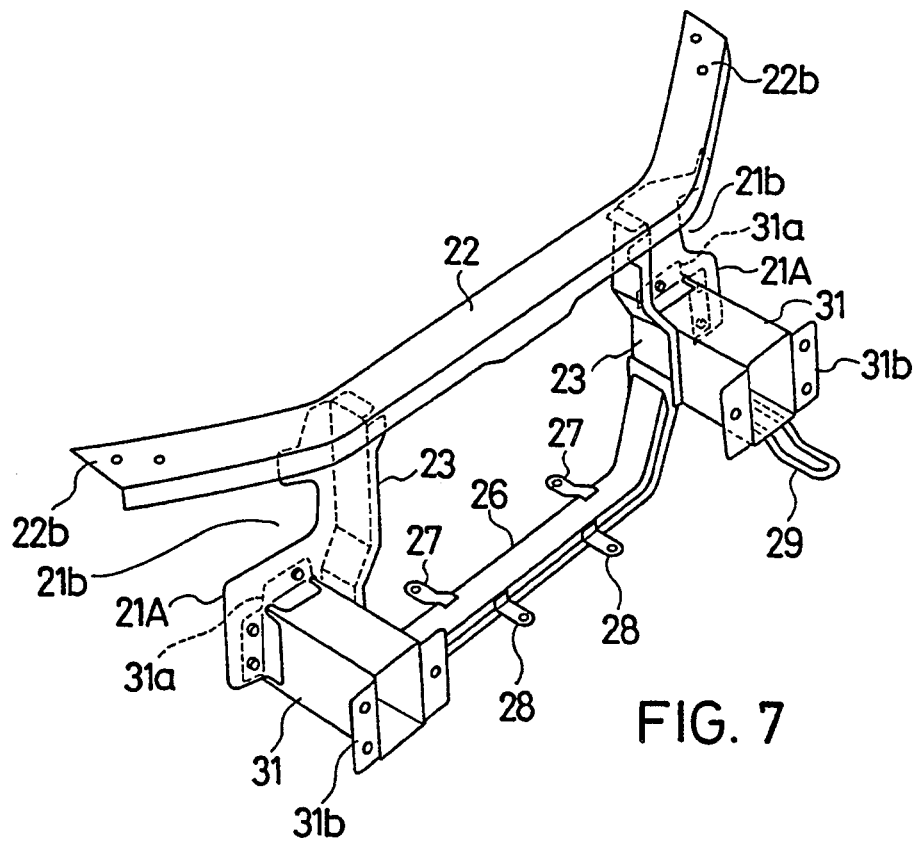
FIG. 7 is a schematic perspective view of a modified unit base of a nose unit.

A cross member 26 of a closed sectional construction, which is formed by contacting an upper member 26A with a lower member 26B, is provided on the both lower ends of the vertical members 23. An opening 21a for later described lamp units 61A, 61B is provided on the shroud panel 21, however, the opening can be a cutaway part 21b instead of an opening as shown in FIG. 7.

On the cross member 26, are located supporting brackets 27 for supporting a condenser 24A (FIG. 8) and a radiator 24B (FIG. 8) both as weight members and the supporting brackets 27 are provided on the rear side of the cross member. Supporting brackets 28 for supporting an inter cooler 51 (FIG. 5) are provided on the front side of the cross member. The condenser 24A and the radiator 24B are connected integrally by a member not shown in the drawings, the lower end portion of them are supported by supporting brackets 27 through a rubber mount members, the upper end portion of them is fixed to fitting holes 21a of an upper wall part 22B of the shroud upper 22 by tightening bolts 33 through brackets 30. In FIGS. 6 and 7, reference numeral 29 designates pulling hook fixed to the under side of the junction panel 31.

Figure 8:
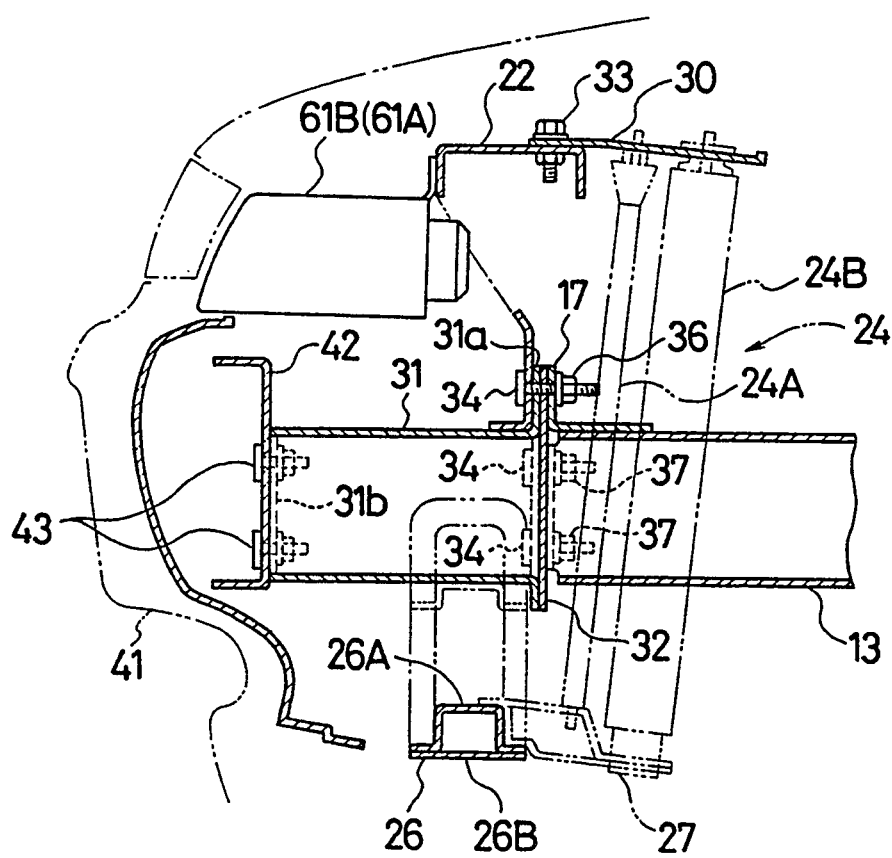
FIG. 8 is a sectional view illustration a mounting at the last step.

A rear end portion of the junction panel 31 of square cylindrical configuration is mounted to the shroud panel 21. As shown in FIG. 8, a rear end flange portion 31a of the junction panel 31 is positioned to the rear side of the shroud panel 21. The junction panel 31 and a front side frame are clamped coaxially by the front side frame 13 (a nut 36 welded on the rear surface of the bracket 17) and a wheel apron 12 (nuts 37 welded or the rear surface of a the flange portion 12c) through a junction plate 32 of flat plate configuration.

Bolts 43 provided on a bumper reinforcement 42 where a bumper 41 is mounted to are fixed to a front end flange portion 31b of the junction panel 31.

The both ends of the bumper 41 are also fixed to a mounting portion 4a of a front fender 4 of the vehicle body 2 by bolts 45 provided on the bumper 41 and bolts (not shown in the drawings) passing through a fitting hole 41a of the bumper 41.

Both ends 22b of the upper wall parts 22B of the shroud upper 22 are overlapped on brackets 15 and are clamped to brackets 15 by bolts 46 (only two bolts 46 of one mounting portion 22b are shown in FIG. 3).

Reference numeral 51 designates an intercooler, an Upper part thereof is clamped to the vertical wall part 22A of the shroud upper 22 by bolts 53 through brackets 52.

Reference numeral 54 designates a radiator grille positioned at front center part of a vehicle, having both right and left mounting portions 54a fitted into fitting holes of the vertical wall parts 22A of the shroud upper 22 and a center mounting portion 54b fitted into a fitting hole of a vertical member 56 of bonnet lock means 55.

Reference numerals 61A, 61B are right and left lamp unit, mounting portions 61a on the upper end of each unit is clamped to the vertical wall part 22A of the shroud upper 22 by bolts 62, and a mounting portion 61b on the lower end of each unit is clamped to the shroud panel 21 by bolts 63 (only bolts 62, 63 and 61b for the lump unit 61A are illustrated in the drawing).

Reference numerals 64, 65 are harness and similar to harness for connecting electric system, the former numeral 64 is clamped to the support member 26 by fastening bolts 67 into a mounting portion 66 and the latter numeral 65 is fixed into a fitting hole of the upper wall part 22B of the shroud upper 22 through mounting portions 68. Reference numerals 71 designate shock absorber members for the shock at opening/closing the bonnet 5 and connected to an upper wall part 22B of the shroud upper 22.

Under the above structure, since the mounting portion 15b (a mounting portion for the shroud upper) for the bracket 15 for the wheel reinforcement 14 is positioned more to the inside of the vehicle body than is the fixing portion for the front fender 4 when the nose unit 3 is inserted to the vehicle body 2 from the front, the nose unit 3 will not interfere with the front fender 4 of the vehicle body 2 and it is positioned by overlapping a fixing portion 22b on the both ends of the shroud upper 22 of the nose unit 3 with a mounting portion 15b of a bracket 15 of the wheel reinforcement 14.

By the two bolts 46 are tightened into nuts 16 of the mounting portion 15b of the bracket 15 from the top, the nose unit 3 (a shroud upper 22) is fixed to the vehicle body 2.

In the above embodiment, the bracket 15 is separated from the wheel reinforcement 14, however, it can be integrally formed with the wheel reinforcement 14 or with a wheel apron 12.

Figures 9, 10:
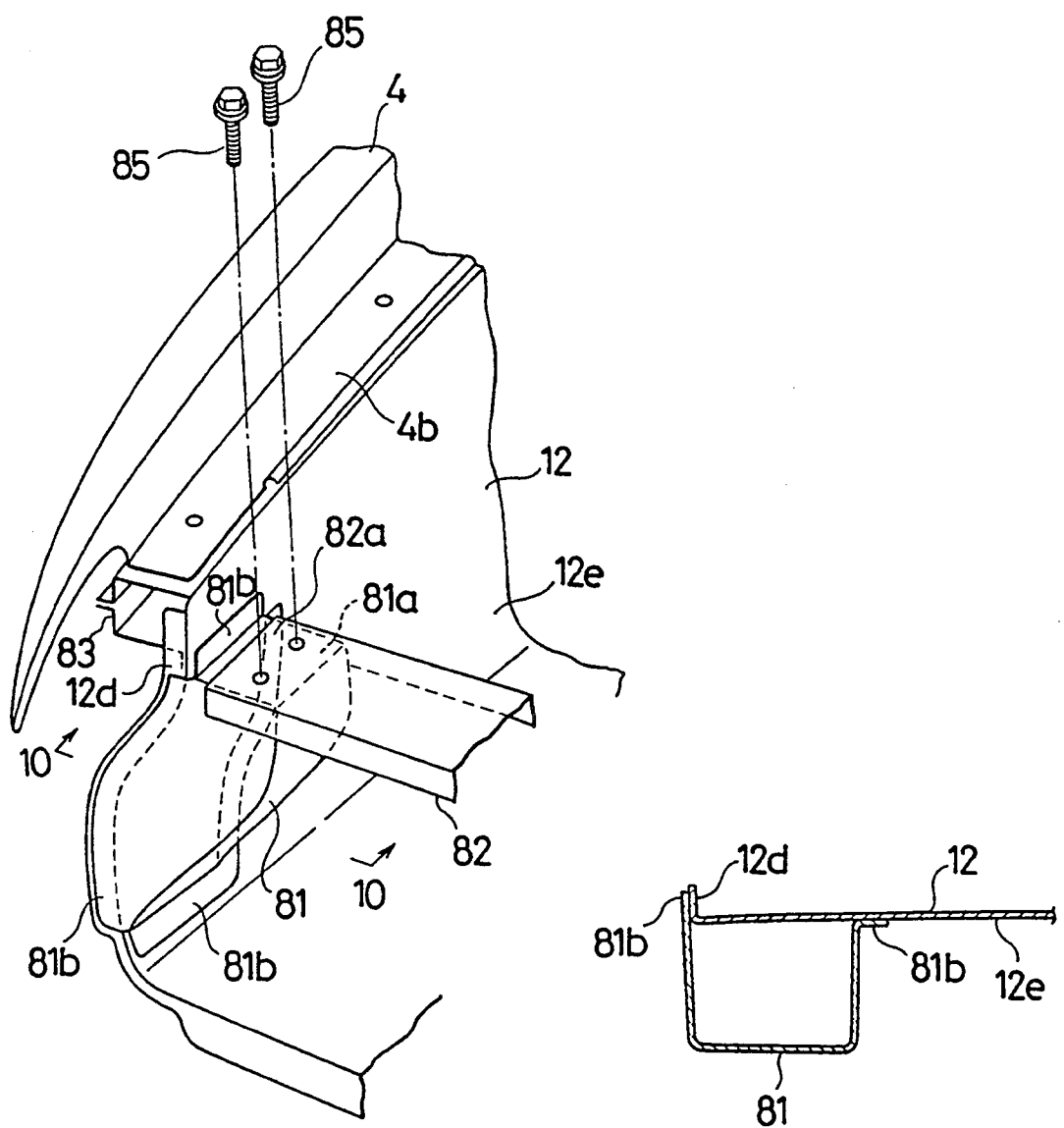
Figure 11:
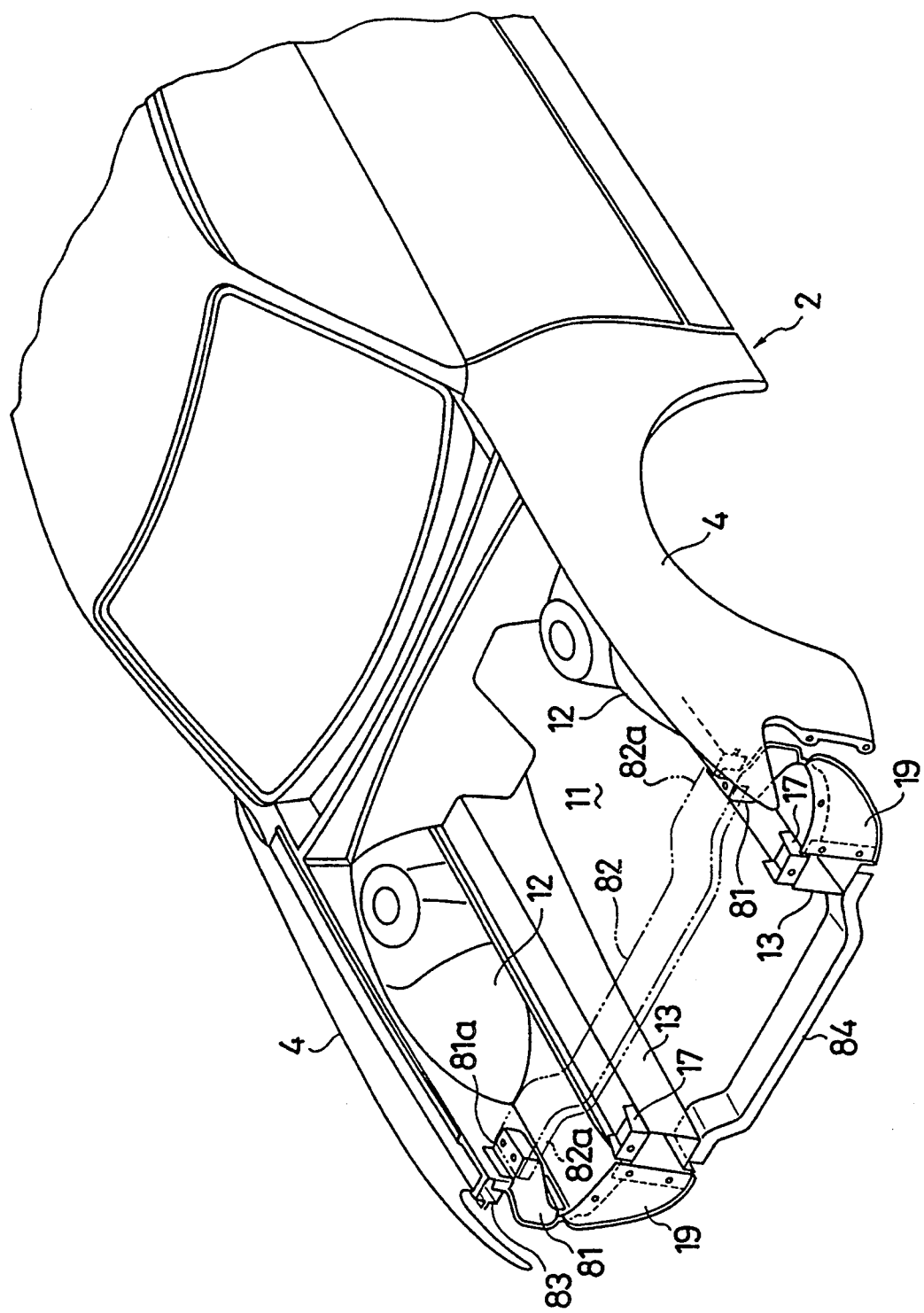

Furthermore, in the above embodiment, a bracket 15 is fixed to the wheel apron reinforcement 14, however, as shown in FIGS. 9–11, a bracket 81 having a hollow is fixed on the engine room side of the wheel apron 12 and is positioned more to the inside and lower than is a mounting portion 4b of the vehicle body 2 of the front fender 4 so that a fixing portion 82a for a shroud upper 82 is clamped to an upper surface 81a of the bracket 81 by bolts 85. The bracket 81 comprises a flange portion 81b on its periphery, the flange portion may be fixed to the front end flange portion 12d and an inner surface 12e of the wheel apron 12 by being welded or may be connected to a wheel apron reinforcement 83. Reference numeral 84 designates a cross member for connecting right and left front side frames 12.

Figure 12:
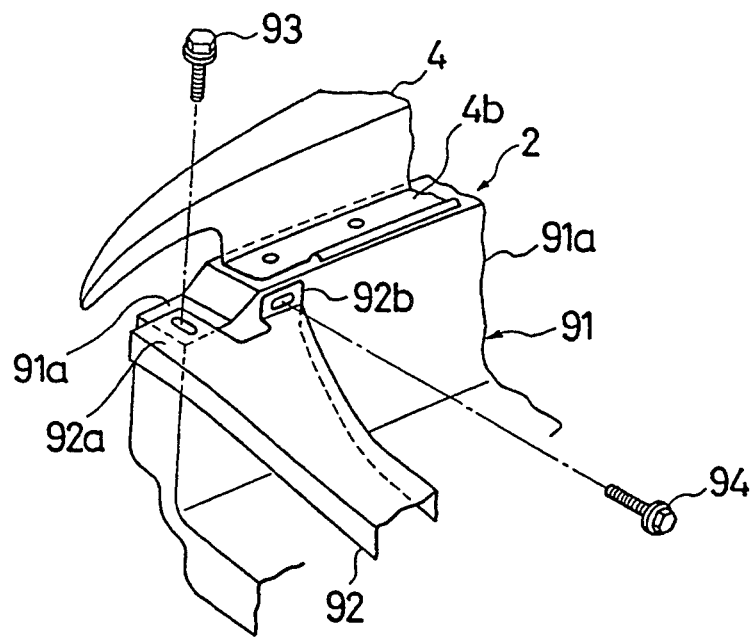
Figure 13:
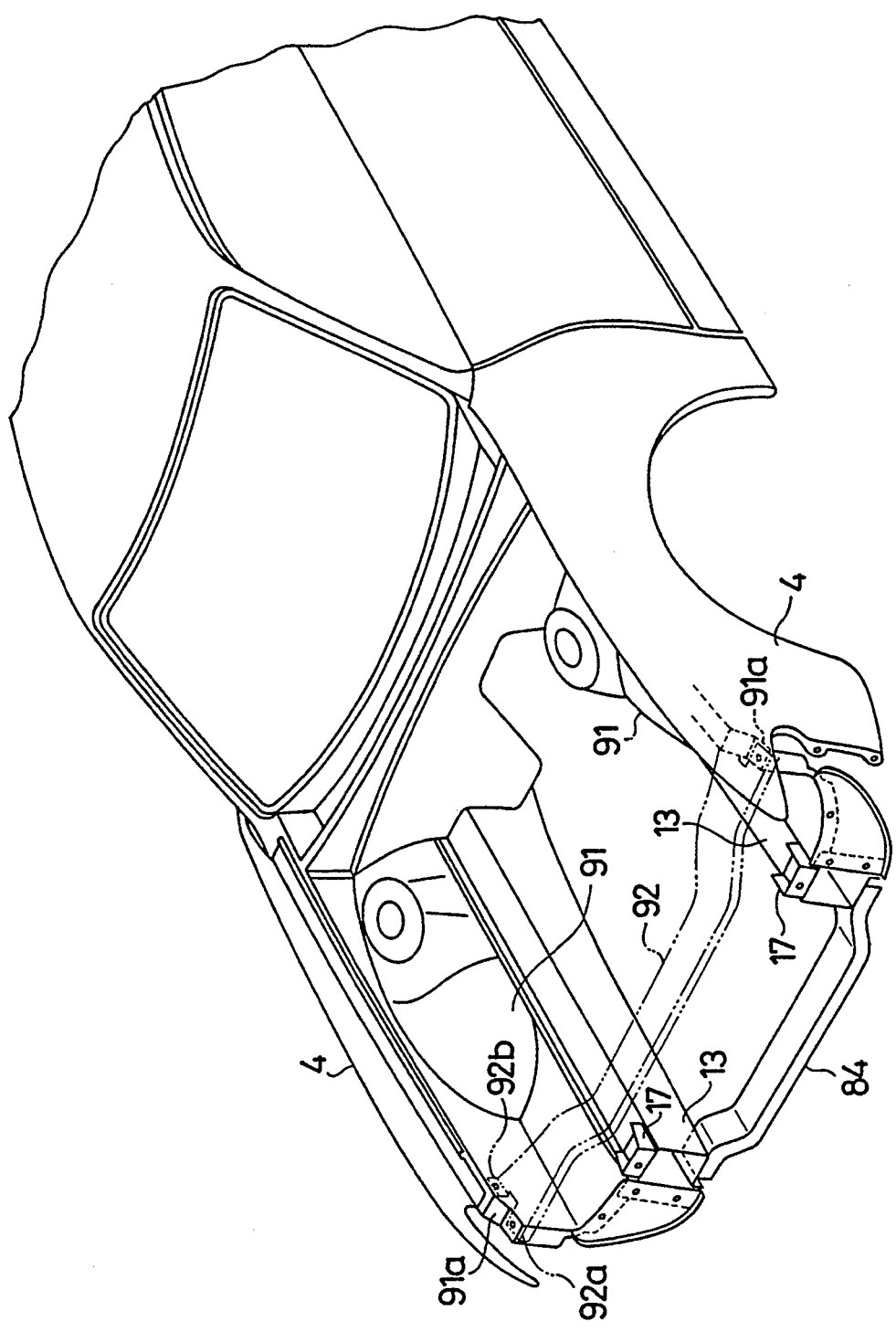

Furthermore, as shown in FIGS. 12 and 13, a mounting portion for mounting a shroud upper of the nose unit may be provided lower than a mounting portion 4b of the front fender 4 to the vehicle body 2. In other words, a step portion 91a as a mounting portion is provided on the upper side of the front end portion of the wheel apron 91, a fixing portion 92 extending horizontally of a shroud upper 92 is clamped to the step portion 91a by a bolt 93. Also, a fixing portion 92b extending vertically on the end of the shroud upper 92 is provided and clamped to an inner surface of the wheel apron 91 by a bolt 94 in order to improve the fixing strength.

In this case as described above, the front vehicle body is assembled in such a fashion that, when the nose unit is inserted to the vehicle body 2 from the front, since the step portion 91a (a mounting portion for the shroud upper) of the wheel apron 91 is positioned further in front of the vehicle body than the mounting portion 4b of the front fender 4, fixing portions 92a, which are both ends of the shroud upper 92 of the nose unit, are overlapped with the step portions 91a of the wheel apron 91 and determine position without interference of the nose unit with the front fender of the vehicle body 2.

The shroud upper 92 of the nose unit is clamped to the vehicle body 2 by fastening a bolt 93 from the top to the step portion 91a (a nut welded on the under surface) and fastening a bolt 94 from the lateral side to the inner surface of the wheel apron 91 (a nut welded on the under surface).

Figure 14:
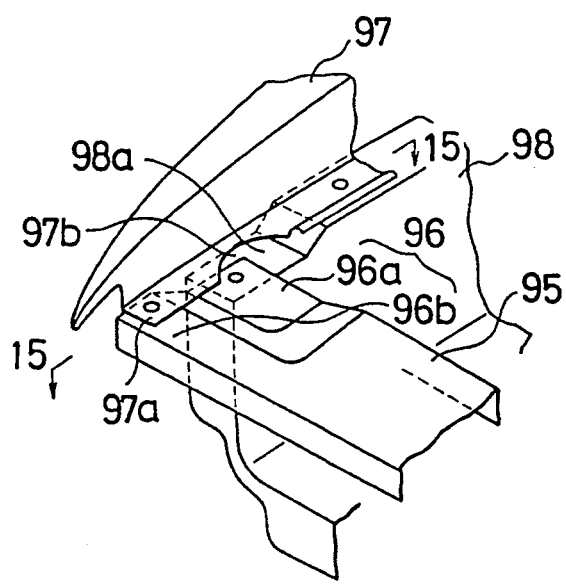
Figure 15:
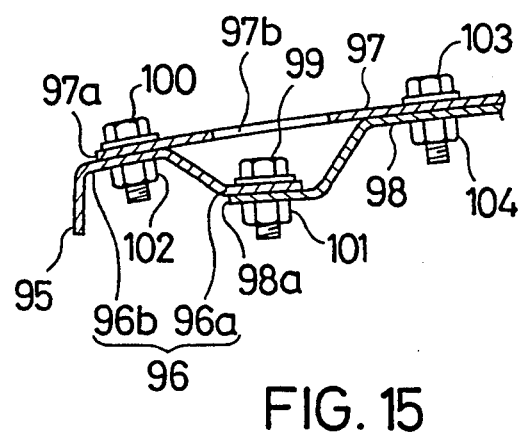

Also, as shown in FIGS. 14 and 15, by having a fixing portion 96 of a shroud upper 95 formed a step configuration comprising a lower part 96a (a first fixing portion) and an upper part 96b (a second fixing portion), the front fender can be extended further in front than that of FIG. 12. The lower part 96a and the upper part 96b of the fixing portion 96 are clamped to a step portion 98a of the wheel apron 98 and a front end portion 97a of the front fender by a bolt 99, and 100 respectively. Nuts 101, 102 for clamping are fixed to an underside of a step potion 98a of a step portion and an upper part 96b of the fixing portion 96 respectively. Reference numeral 103, 104 designate a bolt and a nut for clamping a front fender 97 to the wheel apron 98. Reference numeral 97b designates a cutaway portion for fastening a bolt 99.

Although fixing portions 92a, 96 of the shroud upper 92, 95 are clamped directly to step portions 91a, 98a of wheel aprons 91, 98 in the above embodiment, it can be clamped indirectly through a bracket positioned on a step portion.

Figures 16, 17:
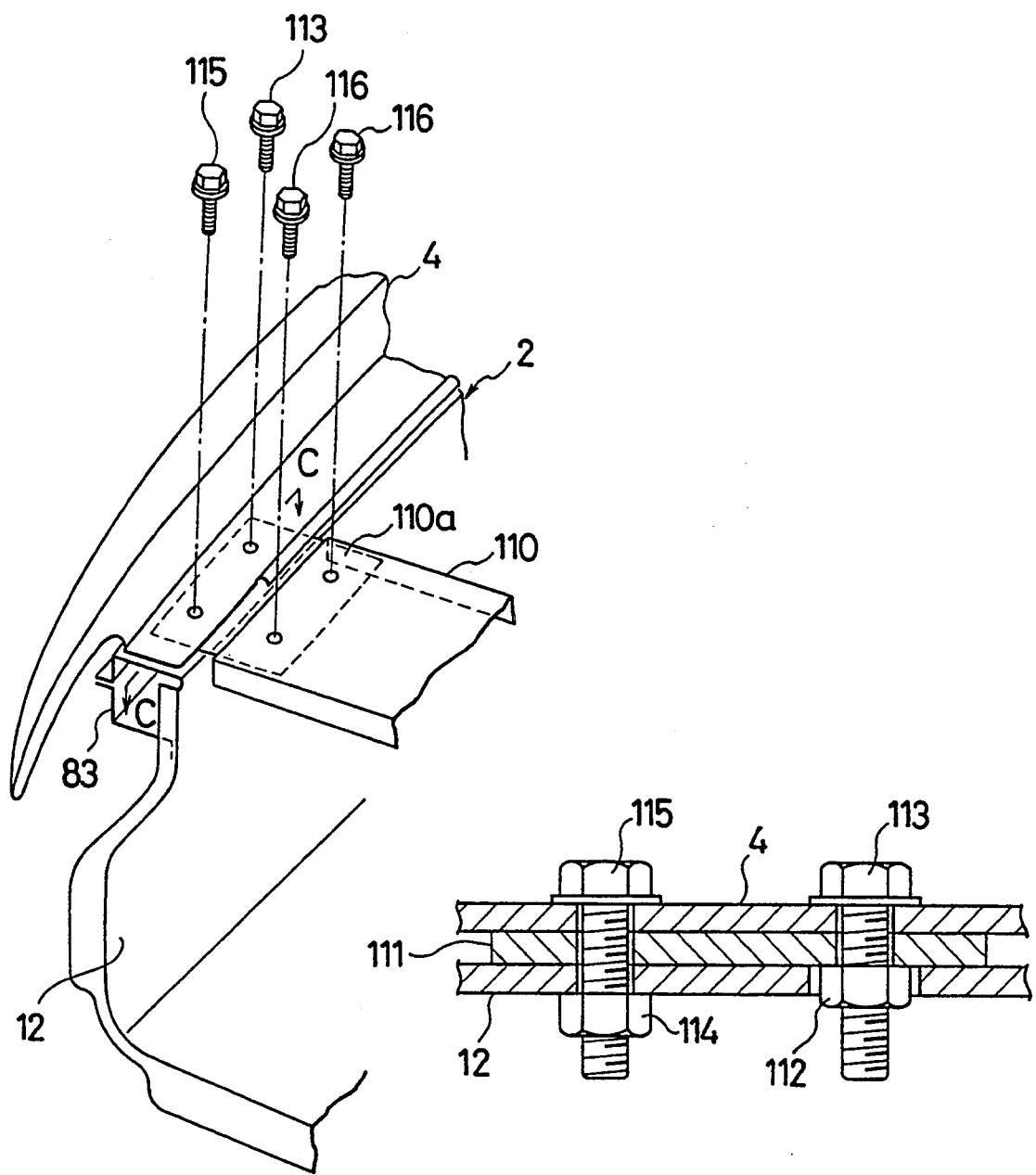
Figure 18:
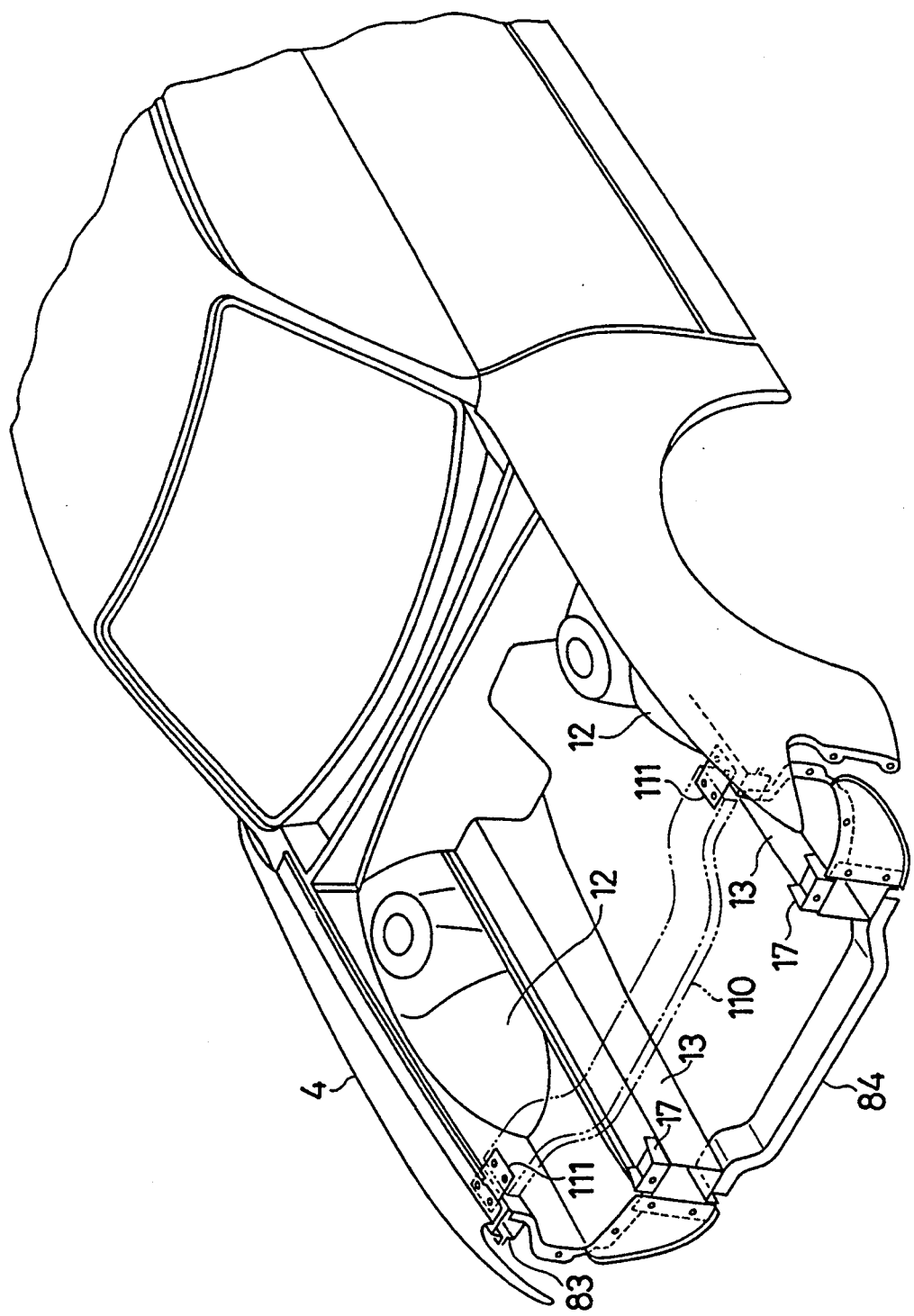

Also, as shown in FIGS. 16 and 18, when a fixing portion 110a for a shroud upper 110 is disposed to a mounting portion for the vehicle body 2 of the front fender 4 on the inner side, a bracket 111 for supporting the shroud upper 110 cannot be fixed both to the vehicle body 2 and the shroud upper 110.

In other words, before the nose unit 3 is mounted to the vehicle body 2, a first fixing portion is constructed by clamping a bracket 111 to the front fender 4, which is done by fastening a bolt 113 wherein a base part of the bracket 111 is overlapped on the under side of the front fender 4. Then the front fender 4, where the base part of the bracket 111 is fixed to, and a bracket 111 are overlapped on the top of the wheel apron 12 so that a second fixing portion is formed by clamping them by a bolt 115 and a nut 114. Through this, the bracket 111 is fixed to the wheel apron 12 (the vehicle body 2) together when the front fender 4 is fixed to the wheel apron 12.

Under this condition, the nose unit 3 is inserted and determines the position of it and a fixing portion 22b for the shroud upper 22 is clamped to the bracket 111 by a bolt 116. When the front fender 4 is replaced, it can be removed by untightening bolts 113, 115.

Furthermore, on the above embodiment, the support member for supporting a heavyweight member such as a radiator comprises one member extending in the widthwise direction of the vehicle body, however, it may comprise two support members 128 having separated with a fixed distance in the widthwise direction.

Figure 19:
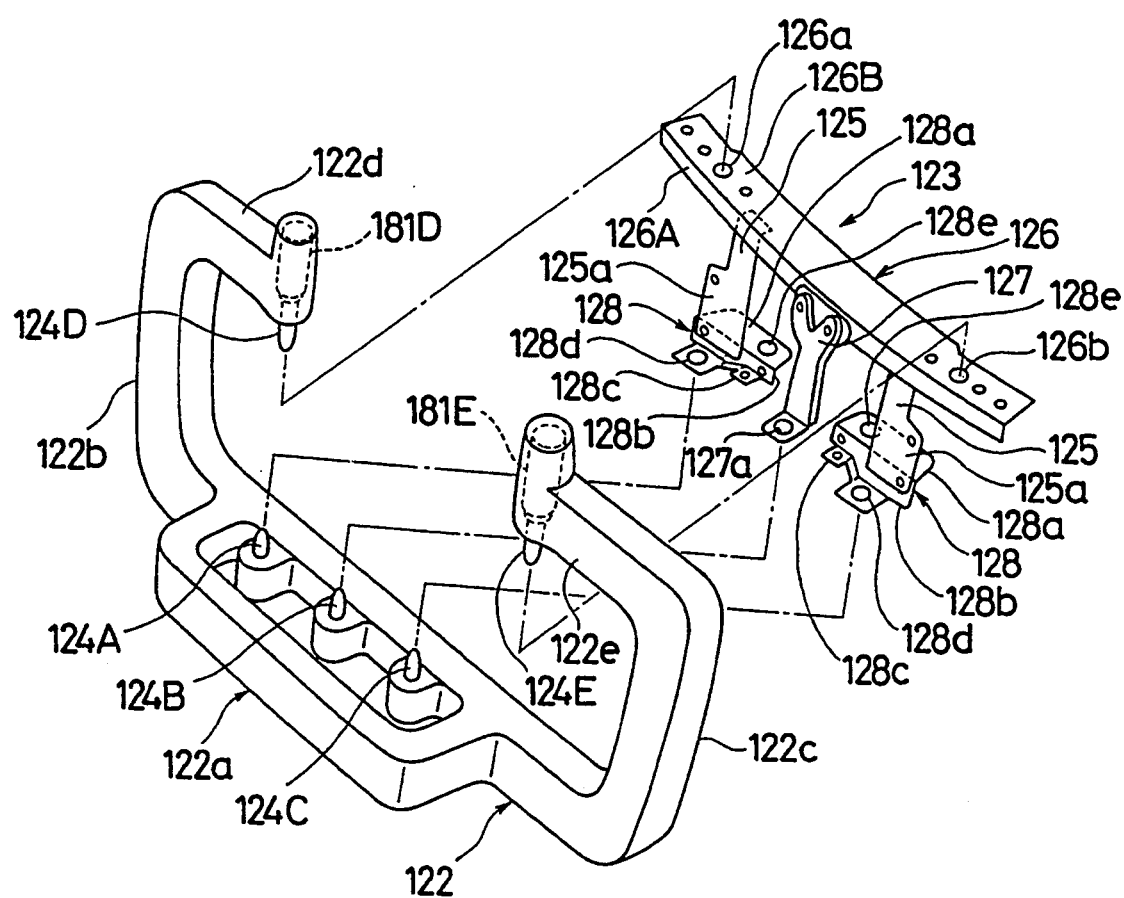
Figure 20:
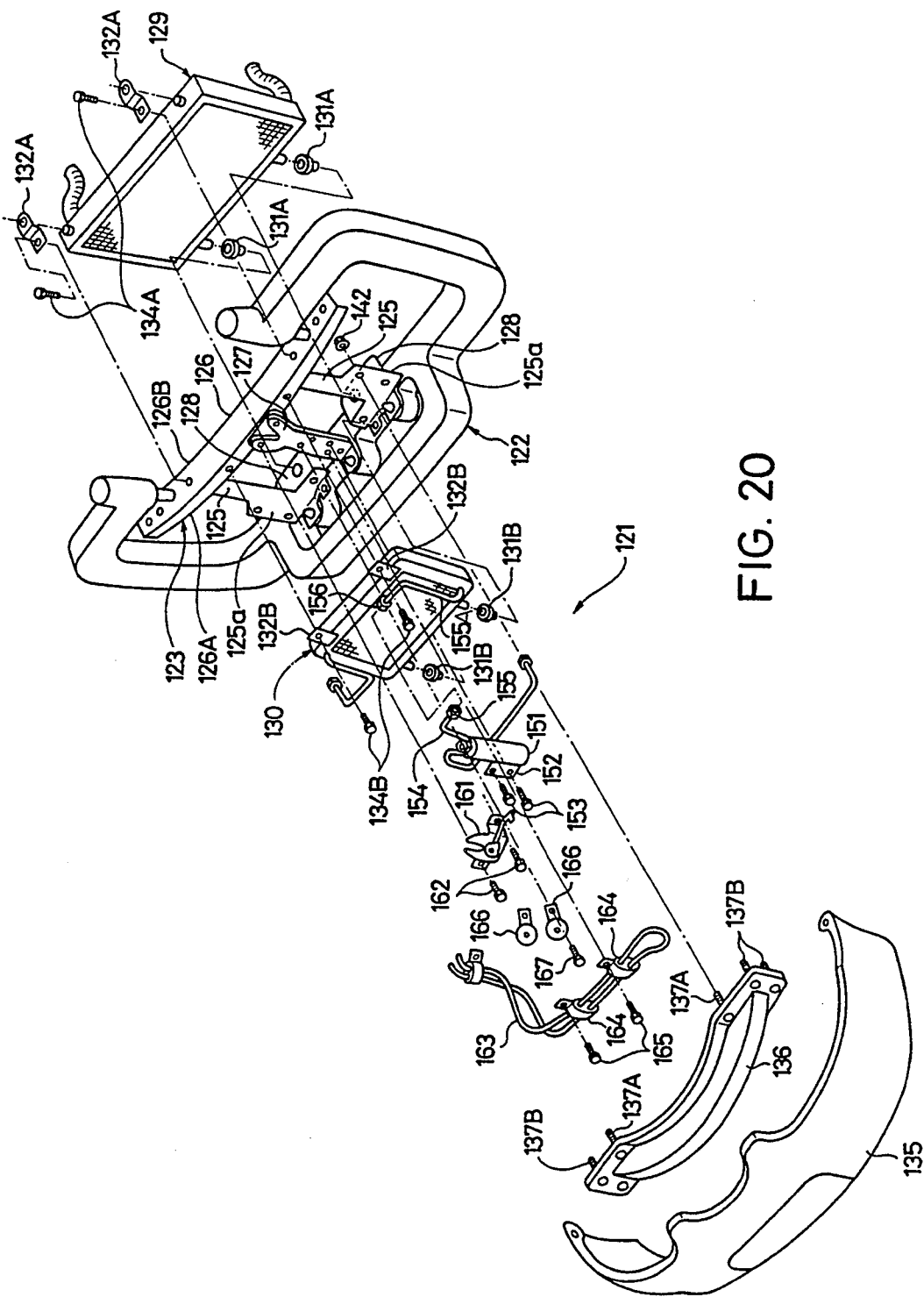

As shown in FIGS. 19 and 20, each component is fitted to a nose unit 121 wherein a nose base 121 is put on a jig 122 for mounting the nose unit.

The jig 122 for mounting the nose unit comprises a base part 122a extending in the widthwise direction of the vehicle body, vertical arm parts 122b, 122c extending upwardly from the both ends of the base part 122a, and arm parts 122d, 122e extending inwardly from the upper ends of the arm parts 122d, 122e. On the base part 122a, three engaging pins 124A, 124B, 124C are provided upwardly projecting, but moving in the vertical direction, and on the arm parts 122d, 122e, two engaging pins 124D, 124E are provided downwardly projecting, but moving in the vertical direction. The engaging pins 124A–124E moves vertically by cylinders (only cylinders 181D, 181E for the engaging pins 124D, 124E are shown in the drawing).

A unit base 123 comprises right and left shroud panels 125, a shroud upper 126 extending in the widthwise direction of the vehicle body and fixed to the upper end of the shroud panels 125, a center stay 127 hanging down from the mid-position of the shroud upper 126 in the widthwise direction of the vehicle body, and first and second support members 128 each fixed to the lower end portion of each shroud panel 125.

Figure 25:
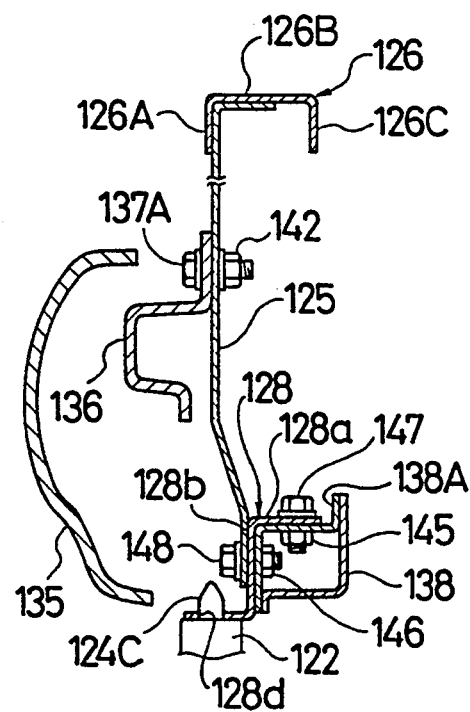
Figure 26:
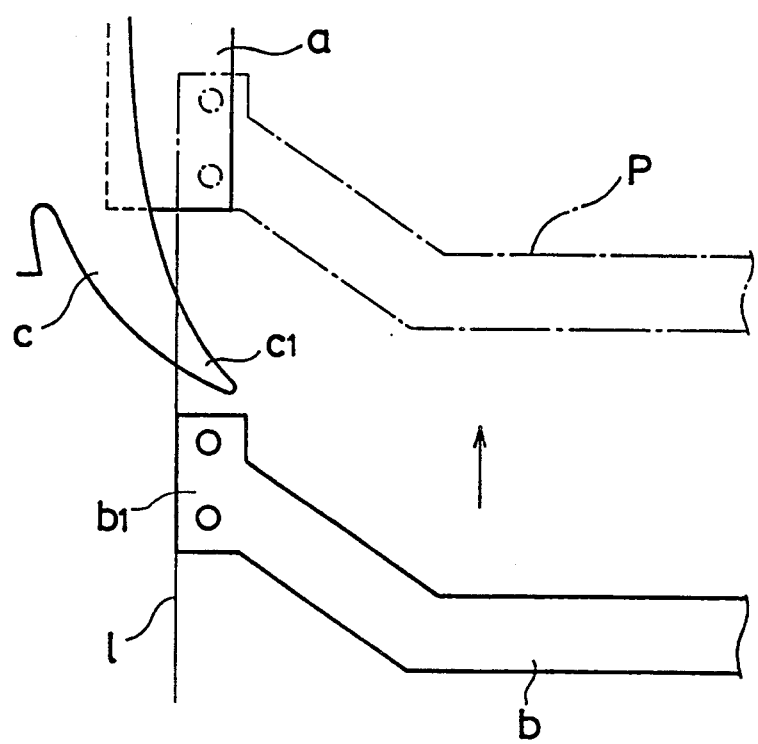
FIG. 26 is a descriptive diagram for a conventional art.

In detail, the shroud upper 126 comprises a vertical wall part 126A extending vertically, an upper wall part 126B extending rearwardly from the upper end of the vertical wall part 126A, and a rear wall part 126C extending downwardly from the rear end of the upper wall part 126B (refer to FIG. 25). The center stay 127 extending in the vertical direction of the vehicle body is hangs down from the mid-position of the vertical wall part 126A in the widthwise direction of the vehicle body.

Each support member 128 comprises an upper wall part 128a for supporting a lower part of a radiator 129 which is a heavyweight member, a vertical wall part 128b extending downwardly from the front end of the upper wall part 128a and is contacted to the shroud side panel 125, and a support part 128c for supporting a cooler condenser 130 which is a heavyweight member and projects to the front from the lower end of the vertical wall part 128b.

On both ends of the shroud upper 126 (the vertical wall part 127A) of the unit base 123, on the lower end of the center stay 127, and on the front part of the support members 128, an engaging part comprising fitting holes 126a, 126b, 127a, 128d, 128d for detachably connecting with the engaging pins 124D, 124E, 124B, 124A, 124C are formed. The position of the nose unit 121 is determined by the relationship between the engaging pins 124D, 124E, 124B, 124A, 124C and the fitting holes 126a, 126b, 127a, 128d, 128d.

Figure 23:
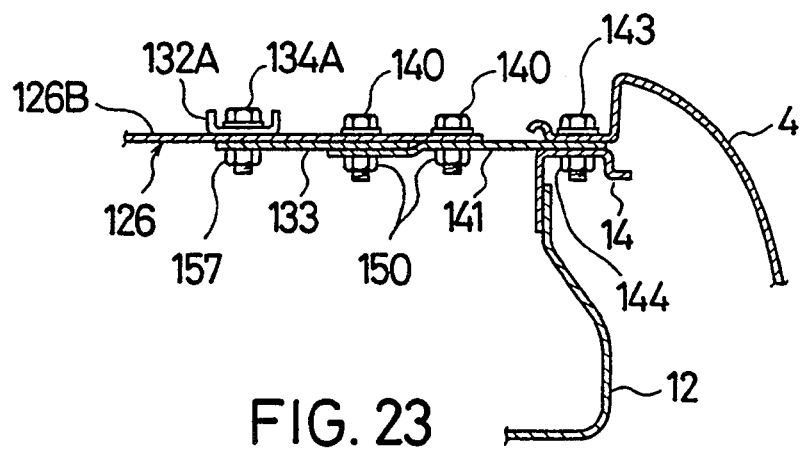

A lower end portion of a radiator 129 and the cooler condenser 130 is supported by upper wall parts 128a of the support members 128 (fitting holes 128e) and support parts 128c (fitting holes) through rubber mounts 131A, 131B. The upper end portion of the radiator 129 and the cooler condenser 130 are clamped to the upper wall part 126B (fitting holes) of the shroud upper 126 reinforced by a radiator reinforcement 133 (refer to FIG. 23) and a vertical wall part 126A by bolts 134A, 134B through brackets 132A, 132B respectively (FIG. 20). In FIG. 23, reference numeral 157 designates a nut threaded on the bolt 134A which is already welded on the under side of an upper wall part 126B of the shroud upper 126 through the radiator reinforcement 133.

Figure 24:
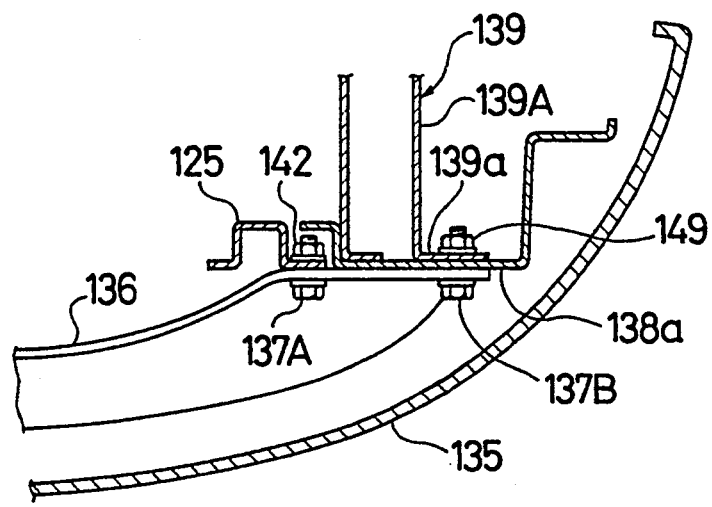

Mounting portions 125a are formed around the lower end portion of the shroud panel 125 so that two inner bolts 137A out of four-in-a-set bolts disposed on the bumper reinforcement 136, which a bumper face 135 is mounted to, are fixed to the mounting portions 125a as a temporary mounting for forming a unit by using a nut 142 (FIG. 24). The other outer two bolts 137B are fixed to a front flange part 139a of a frame outer 139A of a front frame 139 and through side part 138a of a cross member 138 when mounting a nose unit 121 to a front part of a vehicle so that the bumper reinforcement 136 is connected to the vehicle body 2 directly (refer to FIG. 24).

Both ends of the upper wall part 126B of the shroud upper 126 are clamped to a shroud bracket 141 by bolts 140. As shown in FIG. 23, a base part of this shroud bracket 141 is clamped between the wheel apron reinforcement 14 and the front fender 4 by a bolt 143 and a nut 144.

Accordingly, the support member 128 is mounted by the cross member 138 wherein the nose unit 121 is installed in the front part of the vehicle body 2 and fixed to a front wall part and an upper wall part of an upper member 138A of the cross member 138 by bolts 147, 148 and nuts 145, 146 through seven fitting holes of an upper wall part 128a and a front wall part 128b of the support member 128 (refer to FIG. 25).

Reference numeral 151 designates a cooler receiver, the side part thereof is clamped to the center stay 127 by bolts 153 through bracket 152. A joint metal fitting 155 of a horse member 154 from a cooler receiver 151 is connected to a joint metal fitting of a horse member 155A of the cooler condenser 130.

Reference numeral 161 designates bonnet lock means clamped a vertical wall part 126A of the shroud upper 126 by bolts 162 through the center stay 127.

Reference numeral 163 designates a power steering pipe clamped to a center stay 127 and one of the shroud panels 125 through a mounting implement 164 and bolts 165. Reference numerals 166 designate horn member fixed to the center steer 127 by a bolt 167.

Figure 22:
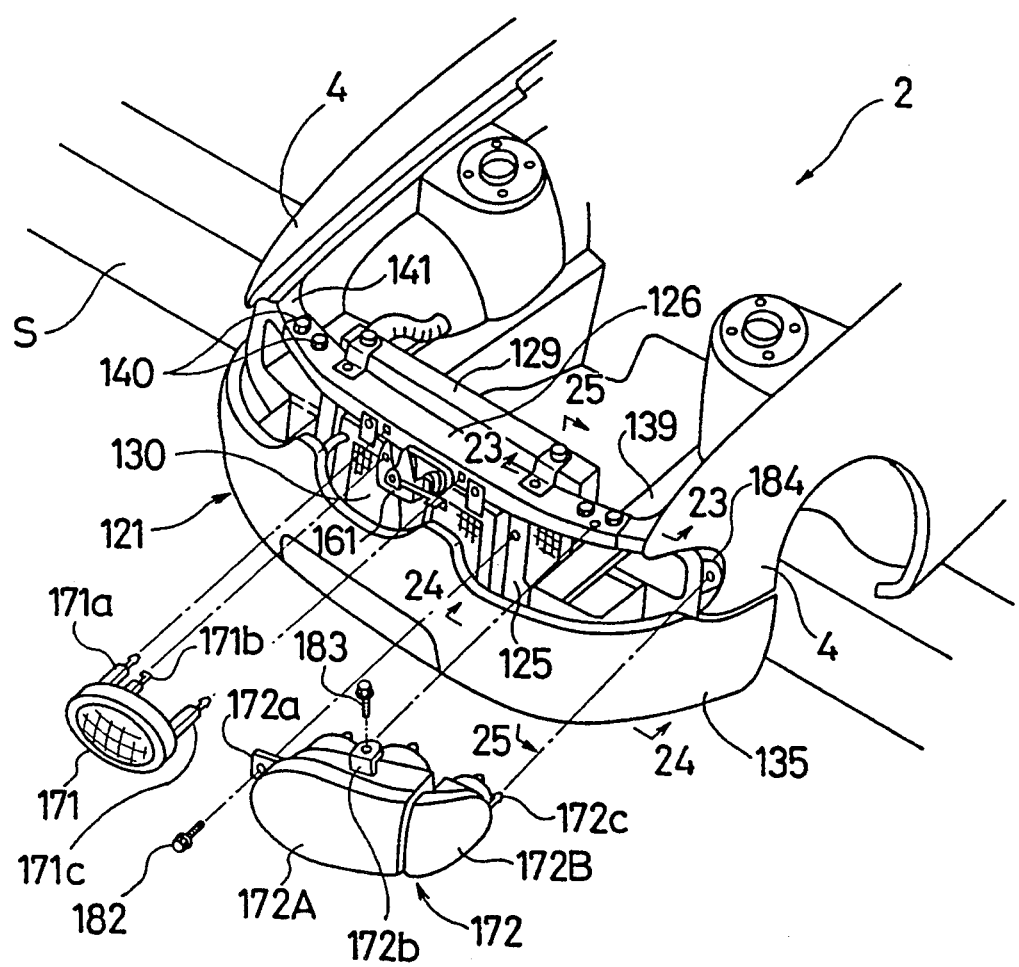

Right and left lamp units 172 comprising a radiator grille 171, headlamp 172A, and a front combination lamp 172B, those positioned front center part of the vehicle, are mounted to the nose unit and the vehicle body after the nose unit 121 is mounted to the vehicle body as shown in FIG. 22, this step differs from the first embodiment. In detail, the radiator grille 171 comprises engaging parts 171a, 171b, 171c, having right and left side engaging parts 171a, 171c connected detacheably to a vertical wall part 126A (a fitting hole) of the shroud upper 126 and a center engaging part 171b connected detacheably to a vertical wall part 126A (a fitting hole) of the shroud upper 126 through bonnet lock means 161. In a lamp unit 172, mounting portions 172a, 172b on the headlamp 172A side are clamped to a side end portion of the shroud panel 125 and un Upper wall part 126B (a fitting hole) of the shroud upper 126 by bolts 182, 183 respectively, and an engaging portion 172c on the front combination lamp 172B side is fitted in to an engaging portion 184 of the wheel apron.

According to the above structure, each components is mounted to the unit base wherein the unit base 123 is supported by the FIG. 122 for mounting the nose unit and also positioned the relationship between the engaging pins 124A–124E and the fitting holes 126a, 126b 127a, 128d, 128d (refer to FIG. 20).

Figure 21:
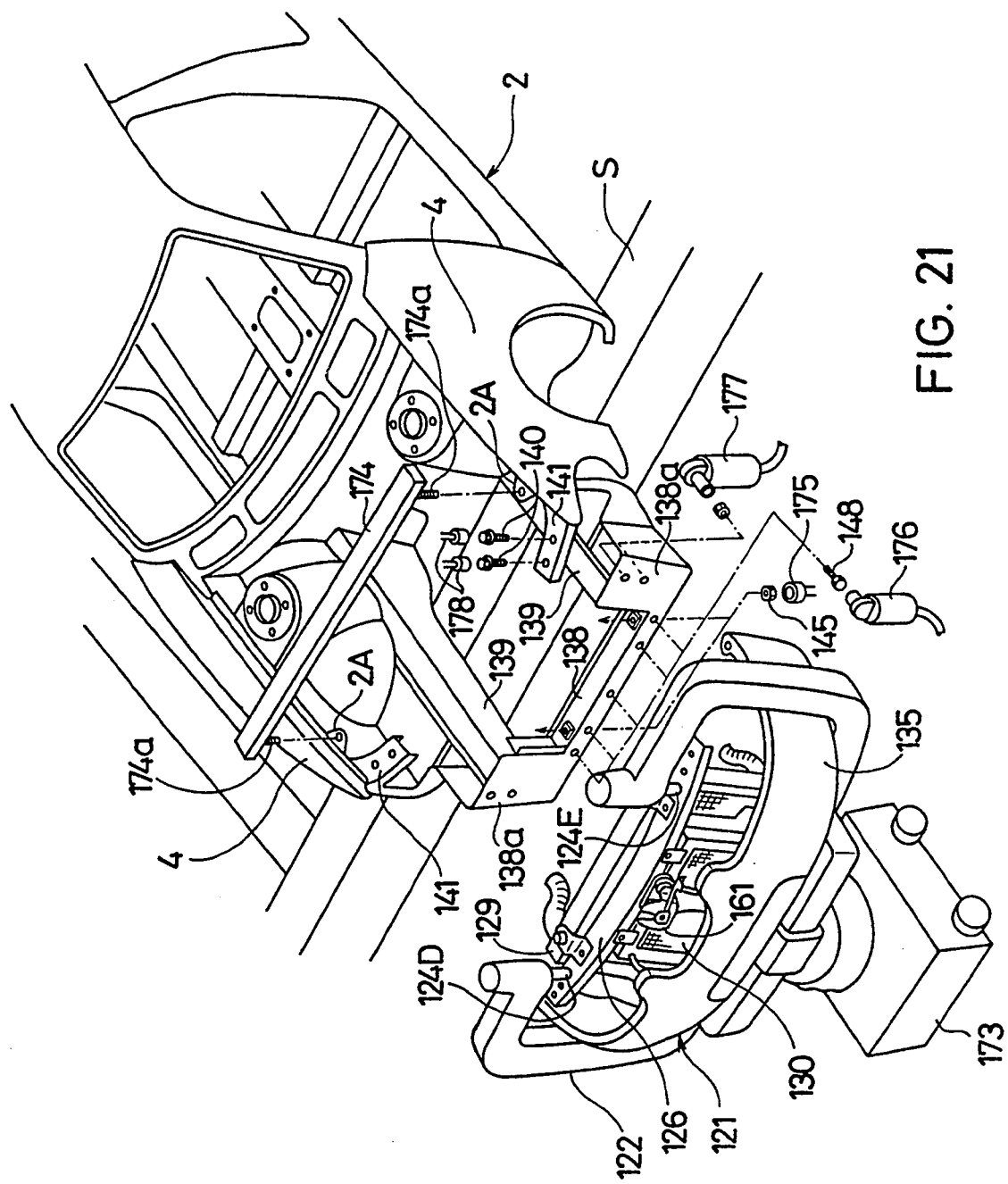

After fitting components to the nose unit, as shown in FIG. 21, the nose unit 121 is put on a truck 173 with the jig 122 and mounted to the front part of the vehicle body 2 moving on an assembling line S (a main line). At this moment in this embodiment, in order to lessen the deformation of the vehicle body 2 (so to speak a front opening), although engaging projecting parts 174a of a deformation preventing tool 174 for preventing the deformation is detacheably engaged with engaging portions 2A of both right and left sides of the vehicle body 2, engaging portions 2A and the deformation preventing tool 174 can be excluded since the cross member 138 has an effect for preventing a deformation of the front part of a vehicle.

Thus, the center stay 127 and the support member 128 are clamped to the cross member 138 by tightening the bolt 147 into a nut 146 through fastener 175, 176 using a bolt 148 and a nut 145. Also, the bumper reinforcement 136 is clamped to a side part 138a of the cross member 138 by screwing a nut 149 on a bolt 137B by a fastener 177.

Moreover, the shroud upper 126 is clamped to the shroud bracket 141 by screwing nuts 150 on bolts 140 by a fastener 178.

The radiator grille 171 and the lamp unit 172 are installed after thus the nose unit 121 is mounted to the front part of the vehicle body 2 (refer to FIG. 22).

Since numerous modification and variations of the present invention are possible without departing from the spirit or scope of the invention, the above embodiments are not for restricting an embodiment but for explaining an embodiment. Also, the scope of the present invention is to be considered as being delimited, not by any particular details of the disclosed preferred embodiments, or of the drawings, but solely by the scope of the accompanying claim, and therefore it is aimed to a cover all such modifications and variations as fall within the scope and spirit of this invention.

What is claimed is:

1. A front body structure of a vehicle including a front fender mounted to a front part of a vehicle body, wheel apron means mounted to the front part of said vehicle body, and a nose unit having at least both a shroud panel and a shroud upper mounted to the front part of said vehicle body, said nose unit comprising:

a first mounting portion for mounting said front fender to said wheel apron means; and a second mounting portion for mounting said nose unit to said wheel apron means being disposed further inboard with respect to said vehicle body than said first mounting portion, said second mounting portion comprising a bracket having a base part connected to a front end portion of said wheel apron means and a mounting part extending inboard from said base part, said nose unit being a unitary assembly of components, including components not utilized for mounting said nose unit to said front part, said nose unit being separately attachable to and detachable from said vehicle body, whereby said nose unit is capable of separate assembly prior to mounting on said body, said nose unit further including an engaging part formed on each end of said shroud upper, said engaging part containing a fitting hole for detachably connecting a jig engaging pin and a plurality of fixing holes for fixing said shroud upper, by bolts, to said second mounting portion of said vehicle body, wherein said shroud upper is disposed in the width direction of the vehicle and said shroud panel extends downwardly from said shroud upper.

2. A front body structure of a vehicle as claimed in claim 1, wherein said base part of said bracket is connected to said front fender and said wheel apron means of said vehicle body.

3. A front body structure of a vehicle as claimed in claim 1, wherein said base part of said bracket is held between said front fender and said wheel apron means of said vehicle body.

4. A front body structure of a vehicle as claimed in claim 1, wherein said nose unit further comprises left and right shroud panels and a center stay positioned intermediate said shroud panels, said shroud panels and center stay being attached to and depending downwardly from said shroud upper.

5. A front body structure as claimed in claim 4 wherein each of said shroud panels includes a support member at a lower end thereof.

6. A front body structure as claimed in claim 5 wherein said shroud panels and said center stay includes fitting holes for releasably engaging jig engaging pins for supporting said nose unit prior to mounting in said vehicle.

7. A front body structure as claimed in claim 5 wherein said support member supports a radiator.

8. A front body structure as claimed in claim 7 wherein said support member supports a condenser.

9. A front body structure of a vehicle as claimed in claim 1, wherein said first mounting portion includes a wheel apron and a wheel apron reinforcement fixed to the wheel apron, said base part of said bracket being connected to said wheel apron reinforcement.

10. A front body structure of a vehicle as claimed in claim 20, wherein said front fender is connected to said wheel apron reinforcement.

11. A front body structure of a vehicle as claimed in claim 10, wherein said base part of said bracket is held between said front fender and said wheel apron reinforcement.

12. A front body structure of a vehicle as claimed in claim 1 wherein said fitting hole has a vertical axis.

13. A front body structure of a vehicle as claimed in claim 12 wherein said fitting hole is disposed further inboard with respect to the vehicle body than the fixing holes on each end of the shroud upper.

14. A front body structure of a vehicle including a front fender mounted to a front part of a vehicle body, wheel apron means mounted to the front part of said vehicle body, and a nose unit having at least both a shroud panel and a shroud upper mounted to the front part of said vehicle body, said nose unit comprising:
a first mounting portion for mounting said front fender to said wheel apron means; and
a second mounting portion for mounting said nose unit to said wheel apron means being disposed further inboard with respect to said vehicle body than said first mounting portion, said second mounting portion comprising a bracket having a base part connected to a front end portion of said wheel apron means and a mounting part extending inboard from said base part,
said nose unit including an engaging part formed on each end of said shroud upper, said shroud upper containing a fitting hole for detachably connecting a jig engaging pin and a plurality of fixing holes for fixing said shroud upper, by bolts, to said second mounting portion of said vehicle body, wherein said shroud upper is disposed in the width direction of the vehicle and said shroud panel extends downwardly from said shroud upper,
wherein the front body structure is provided by:
mounting said front fender to said wheel apron means at said first mounting portion,
mounting said base part of said bracket to said front end portion of said wheel apron means,
determining the position of said nose unit,
mounting said nose unit inboard with respect to said vehicle body to said second mounting portion,
mounting said fixing holes formed on each end of said shroud upper of said nose unit to said mounting part of said bracket, and
fixing said shroud upper to said mounting part of said bracket.

15. A front body structure of a vehicle as claimed in claim 14, wherein said base part of said bracket is connected to said front fender and said wheel apron means of said vehicle body.

16. A front body structure of a vehicle as claimed in claim 14, wherein said base part of said bracket is held between said front fender and a wheel apron of said vehicle body.

17. A front body structure of a vehicle as claimed in claim 14, wherein said nose unit comprises left and right shroud panels and a center stay positioned intermediate said shroud panels, said shroud panels and center stay being attached to and extending downwardly from said shroud upper.

18. A front body structure as claimed in claim 17 wherein each of said shroud panels includes a support member at a lower end thereof.

19. A front body structure as claimed in claim 18 wherein said shroud panels and said center stay include fitting holes for releasably engaging jig means for supporting said nose unit prior to mounting in said vehicle.

20. A front body structure as claimed in claim 18 wherein said support member supports a radiator.

21. A front body structure as claimed in claim 20 wherein said support member supports a condenser.

22. A front body structure of a vehicle as claimed in claim 14, wherein said wheel apron means includes a wheel apron and a wheel apron reinforcement fixed to the wheel apron, said base part of said bracket being connected to said wheel apron reinforcement.

23. A front body structure of a vehicle as claimed in claim 22, wherein said front fender is connected to said wheel apron reinforcement.

24. A front body structure of a vehicle as claimed in claim 23, wherein said base part of said bracket is held between said front fender and said wheel apron reinforcement.

25. A front body structure of a vehicle as claimed in claim 14 wherein said fitting hole has a vertical axis.

26. A front body structure of a vehicle as claimed in claim 25 wherein said fitting hole is disposed further inboard with respect to the vehicle body than the fixing holes on each end of the shroud upper.

27. A front body structure of a vehicle including a front fender mounted to a front part of a vehicle body, wheel apron means mounted to the front part of said vehicle body, and a nose unit comprising a unit base having at least both a shroud panel and a shroud upper mounted to said front part of said vehicle body, comprising:

a first mounting portion for mounting said front fender to said wheel apron means; and a second mounting portion for mounting said nose unit to said wheel apron means being disposed further inboard with respect to said vehicle body than said first mounting portion, said second mounting portion comprising a bracket having a base part connected to a front end portion of said wheel apron means, and a mounting part extending inboard from said base part, wherein said base part of said bracket is held between said front fender and a wheel apron of said vehicle body, said nose unit being a unitary assembly of components, including components not utilized for mounting said nose unit to said front part, said nose unit being separately attachable to and detachable from said vehicle body, whereby said not unit is capable of separate assembly prior to mounting on said body, said nose unit further including an engaging part formed on each end of said shroud upper, said engaging part containing a fitting hole for detachably connecting jig engaging pins and a plurality of fixing holes for fixing said shroud upper, by bolts, to said second mounting portion of said vehicle body, wherein said shroud upper is disposed in the width direction of the vehicle and said shroud panel extends downwardly from said shroud upper.

28. A front body structure of a vehicle as claimed in claim 27, wherein said base part of said bracket is connected to said front fender and said wheel apron means of said vehicle body.

29. A front body structure of a vehicle as claimed in claim 27 wherein said nose unit comprises left and right shroud panels and a center stay positioned intermediate said shroud panels, said shroud panels and center stay being attached to and extending downwardly from said shroud upper.

30. A front body structure as claimed in claim 29 wherein each of said shroud panels includes a support member at a lower end thereof.

31. A front body structure as claimed in claim 30 wherein said shroud panels and said center stay include fitting holes for engaging jig means for supporting said nose unit prior to mounting in said vehicle.

32. A front body structure as claimed in claim 30 wherein said support member supports a radiator.

33. A front body structure as claimed in claim 32 wherein said support member supports a condenser.

34. A front body structure of a vehicle as claimed in claim 27, wherein said wheel apron means includes a wheel apron and a wheel apron reinforcement fixed to the wheel apron, said base part of said bracket being connected to said wheel apron reinforcement.

35. A front body structure of a vehicle as claimed in claim 34, wherein said front fender is connected to said wheel apron reinforcement.

36. A front body structure of a vehicle as claimed in claim 35, wherein said base part of said bracket is held between said front fender and said wheel apron reinforcement.

37. A front body structure of a vehicle as claimed in claim 27 wherein said fitting hole has a vertical axis.

38. A front body structure of a vehicle as claimed in claim 37 wherein said fitting hole is disposed further inboard with respect to the vehicle body than the fixing holes on each end of the shroud upper.

* * * * *

UNITED STATES PATENT AND TRADEMARK OFFICE
CERTIFICATE OF CORRECTION

PATENT NO. : 5,358,304

DATED : October 25, 1994

INVENTOR(S) : Norihiko Kanemitsu, et al.

It is certified that error appears in the above-identified patent and that said Letters Patent is hereby corrected as shown below:

Claims
Col. 11, line 38, "20" should read --9--.

Col. 13, line 20, "not" should read --nose--.

Signed and Sealed this

Twenty-fourth Day of January, 1995

Attest:

BRUCE LEHMAN

Attesting Officer     Commissioner of Patents and Trademarks